United States Patent
Zhang et al.

(10) Patent No.: US 7,289,653 B2
(45) Date of Patent: *Oct. 30, 2007

(54) METHOD AND SYSTEM FOR GROUND GLASS NODULE (GGN) SEGMENTATION USING A MARKOV RANDOM FIELD AND SHAPE ANALYSIS

(75) Inventors: Li Zhang, Skillman, NJ (US); Ming Fang, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/010,813

(22) Filed: Dec. 13, 2004

(65) Prior Publication Data

US 2005/0254697 A1 Nov. 17, 2005

Related U.S. Application Data

(62) Division of application No. 10/898,511, filed on Jul. 23, 2004, now Pat. No. 7,209,581.

(60) Provisional application No. 60/491,650, filed on Jul. 31, 2003, provisional application No. 60/503,602, filed on Sep. 17, 2003.

(51) Int. Cl.
*G06K 9/00* (2006.01)
(52) U.S. Cl. .................... 382/131; 382/173
(58) Field of Classification Search ................ 382/128, 382/131, 132, 173; 128/922
See application file for complete search history.

(56) References Cited

U.S. PATENT DOCUMENTS

| 6,138,045 A * | 10/2000 | Kupinski et al. ........... 600/425 |
| 2003/0179915 A1* | 9/2003 | Goto .......................... 382/128 |
| 2004/0086162 A1* | 5/2004 | Doi et al. ................... 382/131 |
| 2004/0120561 A1* | 6/2004 | Goto .......................... 382/128 |

FOREIGN PATENT DOCUMENTS

WO  WO 2004/109580 A2 * 12/2004

OTHER PUBLICATIONS

Zhang et al., "Consistent interactive segmentation of pulmonary ground glass nodules identified in CT studies," Proc. SPIE vol. 5370: Medical Imaging 2004: Image Processing, May 2004: pp. 1709-1719.*

(Continued)

*Primary Examiner*—Andrew W. Johns
(74) *Attorney, Agent, or Firm*—Donald B. Paschburg; F. Chau & Associates, LLC

(57) ABSTRACT

A system and method for ground glass nodule (GGN) segmentation is provided. The method comprises: selecting a point in a medical image, wherein the point is located in a GGN; defining a volume of interest (VOI) around the point, wherein the VOI comprises the GGN; removing a chest wall from the VOI; obtaining an initial state for a Markov random field; segmenting the VOI, wherein the VOI is segmented using the Markov random field; identifying vessels in the volume of interest; segmenting the vessels; and removing segmented vessels from the segmented ground glass nodule.

82 Claims, 10 Drawing Sheets

OTHER PUBLICATIONS

Fan et al., "Automatic Detection of Lung Nodules from Multi-Slice Low-Dose CT Images," Proc. SPIE vol. 4322: Medical Imgaing 2001: Image Processing, Jul. 2001, pp. 1818-1835.*

Choi et al., "Volumetric Object Reconstruction Using the 3D-MRF Model-Based Segmentation" IEEE Transactions on Medical Imaging, vol. 16, No. 6, Dec. 1997, pp. 887-892.*

Li et al., "Markov Random Field for Tumor Detection in Digital Mammography," IEEE Transactions on Medical Imagng , vol. 14, No. 3, Sep. 1995, pp. 565-567.*

Held et al., "Markov Random Field Segmentation of Brain MR Images," IEEE Transactions on Medical Imaging, vol. 16, No. 6, Dec. 1997, pp. 878-886.*

Takizawa et al., "Recognition of Lung Nodules from X-ray CT Images Using 3D Markov Random Field Models," IEEE Proc. 16th Int. Conf. on Pattern Recognition, Aug. 2002, pp. 99-102.*

Engeler et al., "Ground-Glass Opacity of the Lung Parenchyma: A Guide to Analysis with High-Resolution CT," American Journal of Roentgenology, vol. 160, No. 2, Feb. 1993, pp. 249-251.*

Jang et al., "Bronchioloalveolar Carcinoma: Focal Area of Ground-Glass Attenuation at Thin-Section CT as an Early Sign," Radiology, vol. 1999, No. 2, May 1996, pp. 485-488.*

Collins et al., "Ground-Glass Opacity at CT: The ABCs," American Journal of Roentgenology, vol. 169, No. 2, Aug. 1997, pp. 355-367.*

Heitmann et al., "Automatic detection of ground glass opacities on lung HRCT using multiple neural networks," European Radiology, vol. 7, No. 9, Nov. 1997, pp. 1463-1472.*

Kuriyama et al., "Ground-Glass Opacity on Thin-Section CT: Value in Differentiating Subtypes of Adenocarcinoma of the Lung," American Journal of Roentgenology, vol. 173, No. 2, Aug. 1999, pp. 465-469.*

Watanabe et al., "Results of Wedge Resection for Focal Bronchioloalveolar Carcinoma Showing Pure Ground-Glass Attenuation on Computed Tomography," Ann. Thorac. Surg., vol. 73, No. 4, Apr. 2002, pp. 1071-1075.*

Nagao et al., "Measurement of Localized Ground-Glass Attenuation on Thin-Section Computed Tomography Images: Correlation With the Progression of Bronchioloalveolar Carcinoma of the Lung," Investigative Radiology, vol. 37, No. 12, Dec. 2002, pp. 692-697.*

Tanino et al., "A Detection Method of Ground Glass Opacities in Chest X-ray CT Images using Automatic Clustering Techniques," Proc. SPIE vol. 5032: Medical Imaging 2003: Image Processing, Feb. 2003, pp. 1728-1737.*

* cited by examiner

1) A→H;  2) B→G;  3) C→F;  4) D→E;  5) H→A;  6) G→B;  7) F→C;  8) E→D.

METHOD AND SYSTEM FOR GROUND GLASS NODULE (GGN) SEGMENTATION USING A MARKOV RANDOM FIELD AND SHAPE ANALYSIS

CROSS-REFERENCE TO RELATED APPLICATIONS

This application is a divisional application of U.S. patent application Ser. No. 10/898,511, filed Jul. 23, 2004, now U.S. Pat. No. 7,209,581, which is herein incorporated by reference and which claims priority of U.S. Provisional applications 60/491,650, filed Jul. 31, 2003 and 60/503,602, filed Sep. 17, 2003.

BACKGROUND OF THE INVENTION

The present invention relates to nodule segmentation, and more particularly, to ground glass nodule (GGN) segmentation in pulmonary computed tomographic (CT) volumes using a Markov random field.

Ground glass nodules (GGNs) are, for example, radiographic appearances of hazy lung opacities not associated with an obscuration of underlying vessels. GGNs come in two forms, "pure" and "mixed" as shown in FIG. 1. Pure GGNs do not comprise any solid components, whereas mixed GGNs comprise some solid components.

GGNs are more clearly shown in high resolution computed tomographic (HRCT) images than plain radiographs. GGNs also appear differently than solid nodules in HRCT images because solid nodules have a higher contrast and well defined boundaries. In addition, the appearance of GGNs in HRCT images is a highly significant finding as they often indicate the presence of an active and potentially treatable process such as bronchiolalveolar carcinomas or invasive adenocarcinoma.

Because GGNs are typically associated with active lung disease, the presence of GGNs often leads to further diagnostic evaluation, including, for example, lung biopsy. Thus, a computer-based segmentation can be of assistance to medical experts for diagnosis and treatment of certain types of lung disease. Accordingly, there is a need for a system and method of computer-based segmentation that can be used to accurately and consistently segment GGNs for quick diagnosis.

BRIEF SUMMARY OF THE INVENTION

The present invention overcomes the foregoing and other problems encountered in the known teachings by providing a system and method for ground glass nodule (GGN) segmentation.

In one embodiment of the present invention, a method for ground glass nodule (GGN) segmentation comprises: selecting a point in a medical image, wherein the point is located in a GGN; defining a volume of interest (VOI) around the point, wherein the VOI comprises the GGN; removing a chest wall from the VOI; obtaining an initial state for a Markov random field; segmenting the VOI, wherein the VOI is segmented using the Markov random field; identifying vessels in the VOI; segmenting the vessels; and removing segmented vessels from the segmented GGN.

The method further comprises acquiring the medical image, wherein the medical image is acquired using a computed tomographic (CT) imaging technique.

The method further comprises: detecting the GGN using a computer-aided GGN detection technique automatically, or detecting the GGN manually. The point is automatically or manually selected. The GGN is one of a pure GGN and a mixed GGN.

The method further comprises defining a shape and a size of the VOI. The chest wall is removed by performing a connected component analysis. The method further comprises: performing a shape analysis to remove blood vessels attached to or near the GGN after the GGN in the VOI has been segmented using the Markov random field; and displaying the GGN in the VOI segmented using the Markov random field. In accordance with an aspect of the invention, vessels in the VOI are identified and the identified vessels are segmented and are removed from the segmented GGN.

The initial state for the Markov random field is obtained by performing a region growing on the VOI after the chest wall is removed.

The step of segmenting the VOI using the Markov random field comprises: defining a posteriori probability for the VOI; and labeling each pixel in the VOI using a maximum of the posteriori probability, wherein each pixel in the VOI is labeled as one of a GGN and a background. The defined posteriori probability is computed by $P(L|F) \propto P(F|L)P(L)$. The step of labeling each pixel is computed by $$l_{\bar{x}}(i) = \arg \min_{l \in \{g,b\}} \Big\{ U(g, i-1) + \frac{1}{2\sigma^2}[f(\bar{x}) - \mu_g],$$

$$U(b, i-1) + \frac{1}{2\sigma^2}[f(\bar{x}) - \mu_b] \Big\},$$

where $U(g,i-1)$ and $U(b,i-1)$ are energy values calculated from the labeling state of iteration $i-1$ for GGN and background labels, respectively. $f(\bar{x})$ is the intensity value for voxel $\bar{x}$, and $\mu_g$ and $\mu_b$ are the mean intensity values for GGN and background labels, respectively, wherein the labeling comprises scanning the VOI until a convergence is reached.

The step of identifying vessels comprises: applying thresholding with a sufficiently high threshold $T_{high}$, so as to identify vessels and thereby derive a thresholded VOI; utilizing a process of connected component labeling on the thresholded VOI to find high intensity regions; utilizing 3-dimensional (3D) compactness of the high intensity regions to distinguish vessels from solid components in the GGN; and applying thresholding with a low threshold $T_{low}$, lower than the high threshold $T_{high}$, to obtain a more complete vessel segmentation.

The step of segmenting vessels comprises applying an intensity constrained dilation so as to include boundary voxels into the vessel segmentation and obtain an essentially complete vessel segmentation $O_v$ as follows:

$$O_v = O_{vc} \cup \{\bar{x} | \bar{x} \in (O_{vc} \oplus SE - O_{vc}) \text{ and } I_{\bar{x}} \geq T_{low}\},$$

wherein $O_{vc}$ is the vessel core part segmentation obtained from the foregoing step wherein vessels are distinguished from solid components in the GGN, $\oplus$ denotes morphological dilation, and SE is a dilation structure element, $I_{\bar{x}}$ is an intensity value at location $\bar{x}$, and $T_{low}$ is the lower threshold; and the step of removing segmented vessels from the initially segmented GGN comprises removing the essentially complete vessel segmentation $O_v$ from the segmented GGN $O_{initggo}$ obtained in the step of segmenting the VOI using a Markov random field (MRF) procedure, so as to obtain a final GGN segmentation without vessels $O_{onlyggo} = O_{initggo} - O_v$.

In accordance with another aspect of the invention, a method comprises: applying a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\bar{x} | \bar{x} \in (O_{onlyggn} \circ SE)\} \cap \{\bar{x} | \bar{x} \notin O_{onlyggn}\} \cap \{\bar{x} | I_{\bar{x}} < T_{low}\}),$$

wherein $\circ$ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $T_{low}$, then this pixel is removed from the cleaned final segmentation.

In another embodiment of the present invention, a system for GGN segmentation comprises: a memory device for storing a program; a processor in communication with the memory device, the processor operative with the program to: define a volume of interest (VOI) around a GGN using data associated with a medical image of a lung; remove a chest wall from the VOI; obtain an initial state for a Markov random field; and segment the VOI, wherein the VOI is segmented using the Markov random field. The processor is further operative with the program code to acquire the medical image, wherein the medical image is acquired using a CT imaging technique.

The chest wall is removed by performing a connected component. The initial state for the Markov random field is obtained by performing a region growing on the VOI after the chest wall is removed.

The processor is further operative with the program code when segmenting the VOI using the Markov random field to: define a posterirori probability for the VOI; and label each pixel in the VOI using a maximum of the posteriori probability, wherein each pixel in the VOI is labeled as one of a GGN and a background. The defined posteriori probability is computed by $P(L|F) \propto P(F|L)P(L)$. The step of labeling each pixel is computed by $$l_{\bar{x}}(i) = \arg\min_{l \in \{g,b\}} \left\{ U(g, i-1) + \frac{1}{2\sigma^2} [f(\bar{x}) - \mu_g], \right.$$

$$\left. U(b, i-1) + \frac{1}{2\sigma^2} [f(\bar{x}) - \mu_b] \right\},$$

where $U(g,i-1)$ and $U(b,i-1)$ are energy values calculated from the labeling state of iteration $i-1$ for GGN and background labels, respectively. $f(\bar{x})$ is the intensity value for voxel $\bar{x}$, and $\mu_g$ and $\mu_b$ are the mean intensity values for GGN and background labels, respectively.

The processor is further operative with the program code to: perform a shape analysis to remove blood vessels attached to the GGN from the GGN in the VOI segmented using the Markov random field; and display the GGN in the VOI segmented using the Markov random field, wherein the GGN is visible.

In another embodiment of the present invention, a computer program product comprising a computer useable medium having computer program logic recorded thereon for GGN segmentation, the computer program logic comprising: program code for selecting a point in a medical image, wherein the point is located in or near a GGN; program code for defining a VOI around the point, wherein the VOI comprises the GGN; program code for removing a chest wall from the VOI; program code for obtaining an initial state for a Markov random field; program code for segmenting the VOI, wherein the VOI is segmented using the Markov random field; program code for performing a shape analysis to remove blood vessels attached to the GGN and for removing the blood vessels in the VOI segmented using the Markov random field; and for displaying the GGN in the VOI segmented using the Markov random field, wherein the GGN is visible.

In another embodiment of the present invention, a system for GGN segmentation comprises: means for selecting a point in a medical image, wherein the point is located in a GGN; means for defining a VOI around the point, wherein the VOI comprises the GGN; means for removing a chest wall from the VOI; means for obtaining an initial state for a Markov random field; means for segmenting the VOI, wherein the VOI is segmented using the Markov random field; and means for performing a shape analysis to remove blood vessels attached to or near the GGN after the VOI has been segmented using the Markov random field.

In another embodiment of the present invention, a method for GGN segmentation in pulmonary CT volumes using a Markov random field comprises: selecting a GGN from data associated with a pulmonary CT volume; defining a VOI around the GGN; removing a chest wall from the VOI by performing a connected component analysis on the VOI; obtaining an initial state for an iterated condition mode (ICM) procedure used in the Markov random field modeling by segmenting the VOI with region growing after the chest wall is removed; and segmenting the VOI using a Markov random field, wherein the segmentation comprises: defining a posteriori probability for the VOI; and performing the ICM procedure, wherein the ICM procedure comprises labeling each pixel in the VOI to obtain a maximum of the posteriori probability, wherein each pixel in the VOI is labeled as one of a GGN and a background until each pixel in the VOI is labeled.

The defined posteriori probability is computed by $P(L|F) \propto P(F|L)P(L)$. The step of labeling each pixel during the ICM procedure is computed by $$l_{\bar{x}}(i) = \arg\min_{l \in \{g,b\}} \left\{ U(g, i-1) + \frac{1}{2\sigma^2} [f(\bar{x}) - \mu_g], \right.$$

$$\left. U(b, i-1) + \frac{1}{2\sigma^2} [f(\bar{x}) - \mu_b] \right\},$$

where $U(g,i-1)$ and $U(b,i-1)$ are energy values calculated from the labeling state of iteration $i-1$ for GGN and background labels, respectively. $f(\bar{x})$ is the intensity value for voxel $\bar{x}$, and $\mu_g$ and $\mu_b$ are the mean intensity values for GGN and background labels, respectively, wherein the ICM procedure begins from the initial state.

The method further comprises performing a shape analysis to remove blood vessels attached to or near the GGN after the VOI has been segmented using the Markov random field.

In accordance with an aspect of the invention, a method for ground glass nodule (GGN) segmentation, comprises: selecting a point in a medical image, wherein the point is located in a GGN; defining a volume of interest (VOI) around the point, wherein the VOI comprises the GGN; removing a chest wall from the VOI; obtaining an initial state for a Markov random field; segmenting the VOI, wherein the VOI is segmented using the Markov random field; and performing a shape analysis to remove blood vessels attached to or near the GGN after the VOI has been segmented using the Markov random field.

In accordance with another aspect of the invention, the step of performing a shape analysis comprises: identifying vessels in the VOI; segmenting the vessels; and removing segmented vessels from the segmented GGN.

In accordance with another aspect of the invention, the step of identifying the vessels comprises performing a thresholding and connected component analysis.

In accordance with another aspect of the invention, the step of identifying the vessels comprises performing a 3D compactness analysis.

In accordance with another aspect of the invention, the step of segmenting the vessels comprises performing intensity constrained dilation.

In accordance with another aspect of the invention, a method includes a step of performing a morphological operation following the step of removing segmented vessels.

In accordance with another aspect of the invention a method includes a step of removing any chest wall from the VOI.

In accordance with another aspect of the invention, system for ground glass nodule (GGN) segmentation, comprises: a memory device for storing a program; a processor in communication with the memory device, the processor being operative with the program to: define a volume of interest (VOI) around a GGN using data associated with a medical image of a lung; obtain an initial state for a Markov random field; and segment the VOI, wherein the VOI is segmented using the Markov random field; and perform a shape analysis to remove blood vessels attached to the GGN in the VOI segmented using the Markov random field.

In accordance with another aspect of the invention, the processor, being operative with the program, applies an intensity constrained dilation so as to include boundary voxels into the vessel segmentation and obtain an essentially complete vessel segmentation $O_v$ as follows:

$$O_v = O_{vc} \cup \{\overline{x} | \overline{x} \in (O_{vc} \oplus SE - O_{vc}) \text{ and } I_{\overline{x}} \geq T_{low}\},$$

wherein $O_{vc}$ is the vessel core part segmentation obtained from the foregoing operation wherein vessels are distinguished from solid components in the GGN, $\oplus$ denotes morphological dilation, and SE is a dilation structure element, $I_{\overline{x}}$ is an intensity value at location $\overline{x}$, and $T_{low}$ is the lower threshold; and the step of removing segmented vessels from the initially segmented GGN comprises removing the essentially complete vessel segmentation $O_v$ from an initial GGN segmentation $O_{initggo}$ of the GGN, so as to obtain GGN segmentation without vessels $O_{onlyggo} = O_{initggo} - O_v$.

In accordance with another aspect of the invention, the processor is operative with the program to apply a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\overline{x} | \overline{x} \in (O_{onlyggn} \circ SE)\} \cap \{\overline{x} | \overline{x} \notin O_{onlyggn}\} \cap \{\overline{x} | I_{\overline{x}} < T_{low}\}),$$

wherein ∘ denotes morphological opening, SE is a structuring element, and wherein in the foregoing equation, the part before the minus sign is the general form of morphological opening, and the part following the minus sign imposes an intensity constraint such that, if a pixel added by dilation is lower than the threshold $T_{low}$, then this pixel is removed from the cleaned final segmentation In accordance with another aspect of the invention, a computer program product comprises a computer useable medium having computer program logic recorded thereon for ground glass nodule (GGN) segmentation, the computer program logic comprising: program code for selecting a point in a medical image, wherein the point is located in or near a GGN; program code for defining a volume of interest (VOI) around the point, wherein the VOI comprises the GGN; program code for removing a chest wall from the VOI; program code for obtaining an initial state for a Markov random field; and program code for segmenting the VOI, wherein the VOI is segmented using the Markov random field; identifying vessels from the VOI, segmenting vessels in the VOI, and removing segmented vessels from the VOI.

In accordance with another aspect of the invention, a system for ground glass nodule (GGN) segmentation, comprises: programmable apparatus for selecting a point in a medical image, wherein the point is located in a GGN; programmable apparatus for defining a volume of interest (VOI) around the point, wherein the VOI comprises the GGN; programmable apparatus for removing a chest wall from the VOI; programmable apparatus for obtaining an initial state for a Markov random field; programmable apparatus for segmenting the VOI, wherein the VOI is segmented using the Markov random field; programmable apparatus for identifying vessels from the VOI; programmable apparatus for segmenting vessels in the VOI; and programmable apparatus for removing segmented vessels from the GGN in the VOI.

In accordance with another aspect of the invention, a method for ground glass nodule (GGN) segmentation in pulmonary computed tomographic (CT) volumes using a Markov random field, comprises: selecting a GGN from data associated with a pulmonary CT volume; defining a volume of interest (VOI) around the GGN; removing a chest wall from the VOI by performing a connected component analysis on the VOI; obtaining an initial state for an iterated condition mode (ICM) procedure by segmenting the VOI after the chest wall is removed; segmenting the VOI using a Markov random field, wherein the segmentation comprises: defining a posteriori probability for the VOI, performing the ICM procedure, wherein the ICM procedure comprises labeling each pixel in the VOI to obtain a maximum of the posteriori probability, wherein each pixel in the VOI is labeled as one of a GGN and a background until each pixel in the VOI is labeled; identifying vessels from the VOI; segmenting vessels in the VOI; and removing segmented vessels from the VOI.

In accordance with another aspect of the invention, a method comprises: applying thresholding with a sufficiently high threshold $T_{high}$, so as to identify vessels and thereby derive a thresholded VOI; utilizing a process of connected component labeling on the thresholded VOI to find high intensity regions; utilizing 3-dimensional (3D) compactness of the high intensity regions to distinguish vessels from solid components in the GGN; and applying thresholding with a low threshold $T_{low}$, lower than the high threshold $T_{high}$, to obtain a more complete vessel segmentation.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
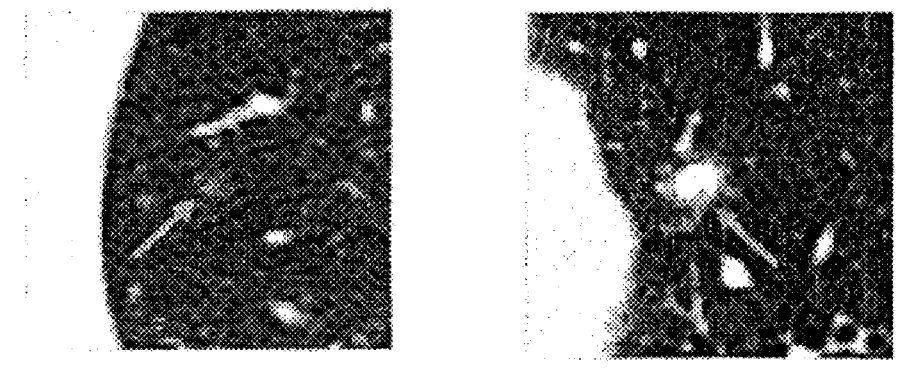
FIG. 1 illustrates a "pure" ground glass nodule (GGN) and a "mixed" GGN.
Figure 2:
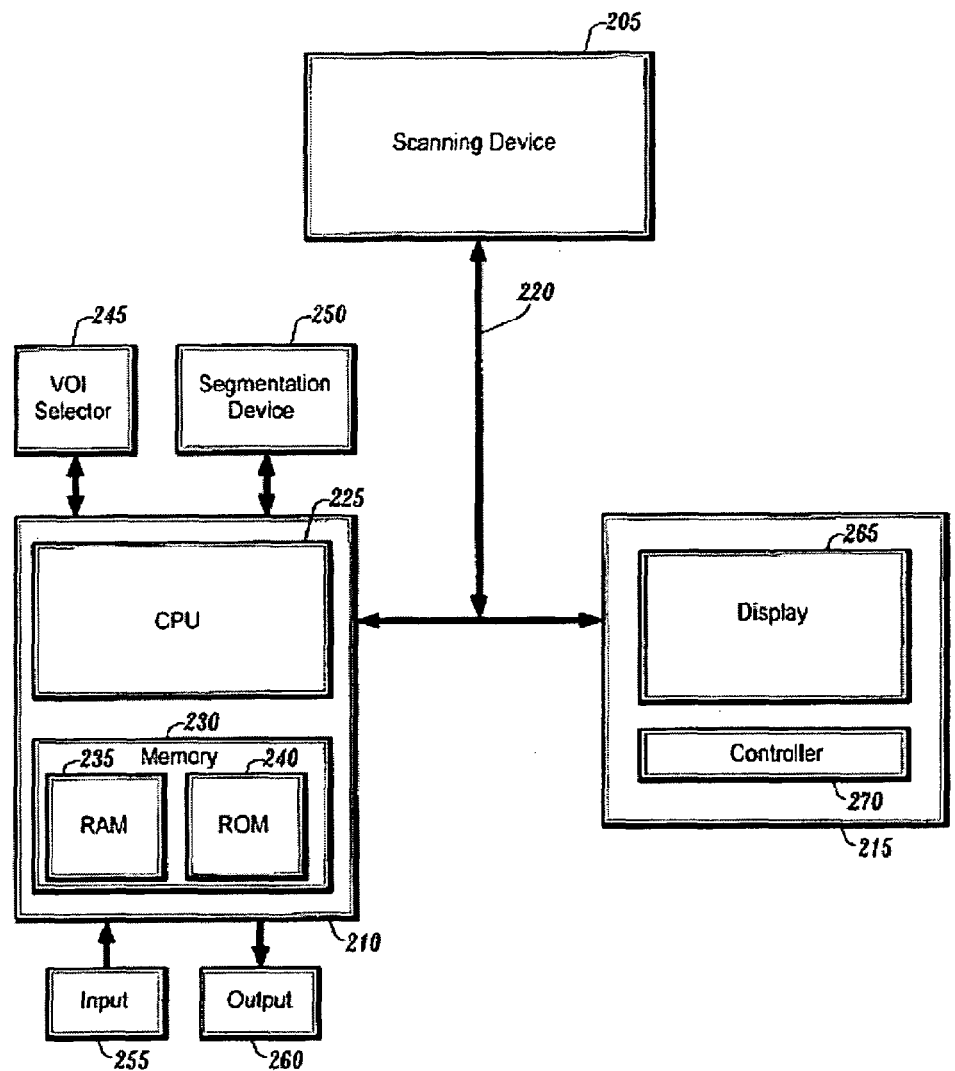
FIG. 2 is a block diagram of a system for GGN segmentation according to an exemplary embodiment of the present invention.

FIG. 2 is a block diagram of a system for ground glass nodule (GGN) segmentation according to an exemplary embodiment of the present invention. As shown in FIG. 2, the system includes, inter alia, a scanning device 205, a personal computer (PC) 210 and an operator's console and/or virtual navigation terminal 215 connected over, for example, an Ethernet network 220. The scanning device 205 is a high-resolution computed tomography (HRCT) imaging device.

The PC 210, which may be a portable or laptop computer, a personal digital assistant (PDA), etc., includes a central processing unit (CPU) 225 and a memory 230, which are connected to an input 255 and an output 260. The PC 210 is connected to a volume of interest (VOI) selector 245 and a segmentation device 250 that includes one or more methods for ground glass nodule (GGN) segmentation. The PC 210 may also be connected to and/or include a diagnostic module, which is used to perform automated diagnostic or evaluation functions of medical image data. In addition, the PC 210 may further be coupled to a lung volume examination device.

The memory 230 includes a random access memory (RAM) 235 and a read only memory (ROM) 240. The memory 230 can also include a database, disk drive, tape drive, etc., or a combination thereof. The RAM 235 functions as a data memory that stores data used during execution of a program in the CPU 225 and is used as a work area.

The ROM 240 functions as a program memory for storing a program executed in the CPU 225. The input 255 is constituted by a keyboard, mouse, etc., and the output 260 is constituted by a liquid crystal display (LCD), cathode ray tube (CRT) display, printer, etc.

The operation of the system is controlled from the operator's console 215, which includes a controller 270, for example, a keyboard, and a display 265, for example, a CRT display. The operator's console 215 communicates with the PC 210 and the scanning device 205 so that image data collected by the scanning device 205 can be rendered in 3D by the PC 210 and viewed on the display 265. It is to be understood that the PC 210 can be configured to operate and display information provided by the scanning device 205 absent the operator's console 215, using, for example, the input 255 and output 260 devices to execute certain tasks performed by the controller 270 and display 265.

The operator's console 215 further includes any suitable image rendering system/tool/application that can process digital image data of an acquired image dataset (or portion thereof) to generate and display 2D and/or 3D images on the display 265. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 210 may also include an image rendering system/tool/application for processing digital image data of an acquired image dataset to generate and display 2D and/or 3D images.

As shown in FIG. 2, the segmentation device 250 is also used by the PC 210 to receive and process digital medical image data, which as noted above, may be in the form of raw image data, 2D reconstructed data (e.g., axial slices), or 3D reconstructed data such as volumetric image data or multi-planar reformats, or any combination of such formats. The data processing results can be output from the PC 210 via the network 220 to an image rendering system in the operator's console 215 for generating 2D and/or 3D renderings of image data in accordance with the data processing results, such as segmentation of organs or anatomical structures, color or intensity variations, and so forth.

It is to be understood that the system and method according to the present invention for GGN segmentation may be implemented as extensions or alternatives to conventional segmentation methods used for processing medical image data. Further, it is to be appreciated that exemplary systems and methods described herein can be readily implemented with 3D medical images and computer-aided diagnosis (CAD) systems or applications that are adapted for a wide range of imaging modalities (e.g., CT, MRI, etc.) and for diagnosing and evaluating various abnormal pulmonary structures or lesions such as lung nodules, tumors, stenoses, inflammatory regions, etc. In this regard, although exemplary embodiments may be described herein with reference to particular imaging modalities or particular anatomical features, nothing should be construed as limiting the scope of the invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

Figure 3:
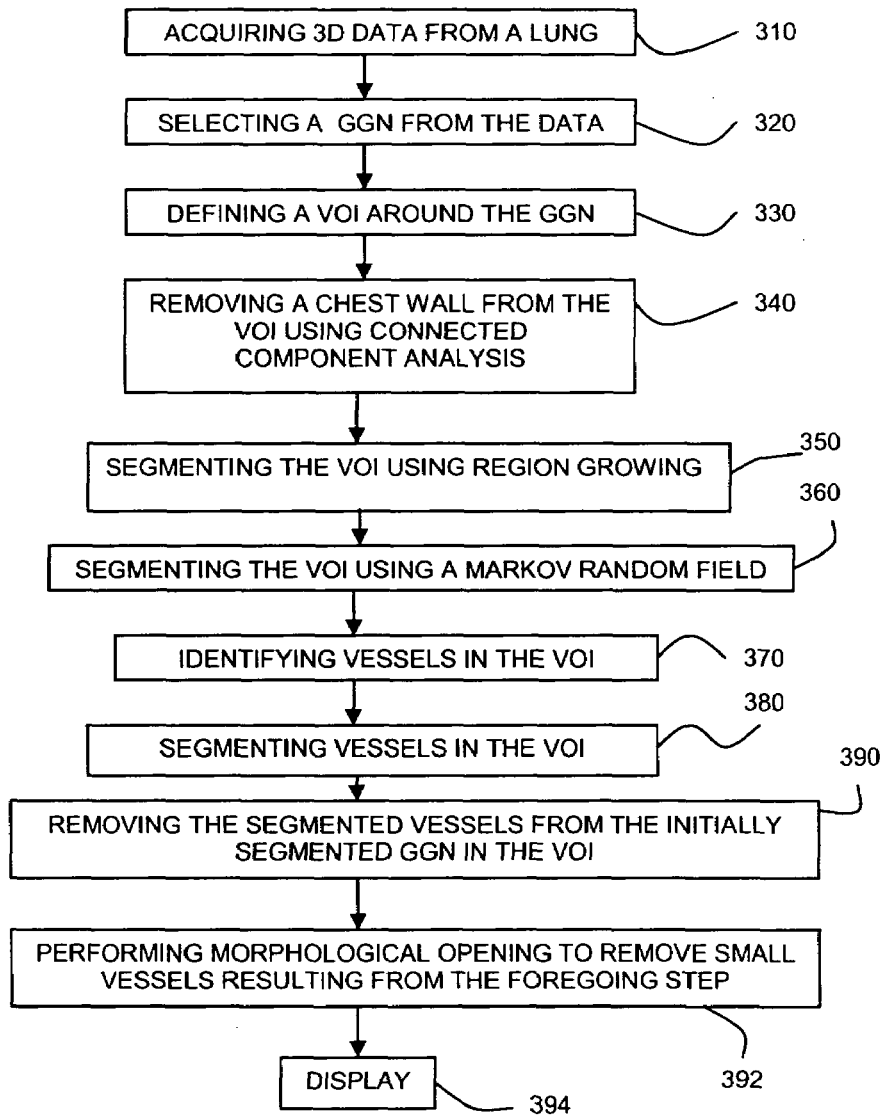
FIG. 3 is a flowchart illustrating a method for GGN segmentation according to an exemplary embodiment of the present invention.

FIG. 3 is a flowchart showing an operation of a method for GGN segmentation according to an exemplary embodiment of the present invention. As shown in FIG. 3, 3D data is acquired from a lung or pair of lungs (step 310). This is accomplished by using the scanning device 205, for example an HRCT scanner, to scan a lung thereby generating a 3D volume comprising a series of 2D images associated with the lung, as shown for example in column (a) of FIG. 7.

After the 3D data is acquired from the lung, a GGN is selected (step 320). This is accomplished, for example, by a medical professional such as a radiologist manually selecting a GGN from the data, or by using a computer-aided GGN detection and/or characterization technique. In step 320, a point in or near the GGN may be selected to locate the position of the GGN. This process can performed manually by a radiologist examining the data associated with the lung or pair of lungs, or automatically by a computer programmed to identify GGNs in medical image data.

After the GGN is selected, a VOI is defined using the VOI selector 245 (step 330). In this step, the size and/or shape of the VOI is defined automatically to include the GGN. An example of a VOI is indicated by the area within a square box positioned around a GGN in column (a) of FIG. 7. A zoomed-in view of the VOI is shown in column (b) of FIG. 7. Next, preprocessing of the VOI is performed. Specifically, a chest wall is removed from the VOI (step 340). Thus, for example, a portion of the VOI that belongs to the chest wall is excluded from the VOI. This is accomplished by performing a connected component analysis to remove a region in the VOI that belongs to the chest wall. Thus, the chest wall's potential influence on further processing techniques, such as MRF segmentation (discussed below), is removed.

Figure 4:
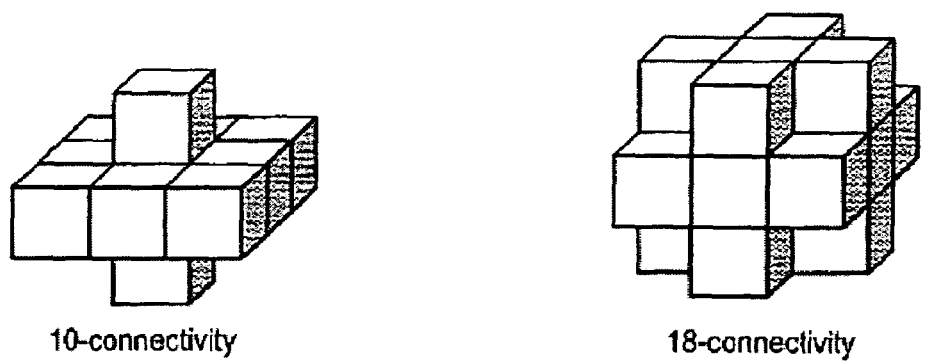
FIG. 4 illustrates connectivity types used during a region growing according to an exemplary embodiment of the present invention.

Next, the VOI (with the chest wall removed) is segmented (step 350). This is performed using, for example, a region growing where a seed point for the region growing is the selected point in the VOI that is either in or near the GGN. An example of the connectivity types that may be used during the region growing are shown in FIG. 4. For example, when pixel and slice spacings ($X_{res}$ and $Z_{res}$, respectively) satisfy the condition for 10-connectivity as shown below in Equation 1 (where d is a predefined distance constant), the 10-connectivity region growing is performed as shown in FIG. 4. Similarly, when the pixel and slice spacings satisfy the condition for 18-connectivity shown in Equation 1, an 18-connectivity region growing is performed as shown in FIG. 4.

$$\begin{cases} \left[\left(\frac{X_{res}}{Z_{res}}\right)^2 + 1.0\right]^{1/2} < d \Rightarrow 10-\text{connectivity} \\ \left[\left(\frac{X_{res}}{Z_{res}}\right)^2 + 1.0\right]^{1/2} \geq d \Rightarrow 18-\text{connectivity} \end{cases} \quad [1]$$

For material on region growing, see, for example, Arthur R. Weeks, "Fundamentals of Image Processing," IEEE Press, New York 1996, pp. 442 et seq., 448 et seq.; Gonzalez and Woods, "Digital Image Processing," Prentice-Hall, New Jersey 2002, p. 612 et seq.; Milan Sonka et al. "Image Processing, Analysis, and Machine Vision," $2^{nd}$ ed., PWS Publishing, New York, 1999, p. 176 et seq., inter alia.

It is to be understood that a variety of additional segmentation techniques may be used in step 350 such as, a histogram analysis based thresholding, Gaussian smoothing, edge detection, and template matching. It is to be further understood that step 350 is performed to obtain an initial segmentation state for an iterated condition mode (ICM) procedure to be performed in step 360 discussed below.

After segmenting the VOI in step 350, the VOI is again segmented using a Markov random field (MRF) (step 360). An MRF, which specifies a nonlinear interaction between similar and different features, is used for example, to combine and organize spatial and temporal information by introducing generic knowledge about features to be estimated. For example, by applying an MRF in step 360, the MRF gives an a priori probability by applying spatial constraints from neighboring voxels in the VOI. A label can then be assigned to each voxel in the VOI by taking into account intensity and spatial constraints from neighboring voxels. Thus, GGNs can be given one label type and non-GGNs or background information, for example, lung parenchyma, blood vessels, chest wall portions, etc. are given the other label type, thereby allowing the VOI segmented using MRF to be displayed discretely illustrating the GGNs and the background as shown, for example, in column (c) of FIG. 7, where an area denoted by a jagged edge in the center of the images illustrates the GGNs and the extraneous area is the background.

The MRF segmentation procedure of step 360 is derived and performed as follows. First, let $\Omega \subset R^3$ denote the VOI, then consider the intensity of the VOI as a random field F($\bar{x}$), where $\bar{x} \in \Omega$. Next, let l denote the segmentation label for a voxel $\bar{x}$, and $l \in L = \{GGN, background\}$. A posteriori probability P(L|F) for labeling the GGNs and the background information is then obtained from the conditional intensity probability P(F|L) and a priori probability P(L) using Bayes' theorem as shown below in Equation 2.

$$P(L|F) \propto P(F|L)P(L) \quad [2]$$

Therefore, the statistical optimal labeling for the MRF segmentation is given by the maximum of a posteriori (MAP).

The conditional probabilities P(F|L) shown above are obtained from GGN and background intensity distributions, which are both modeled by a Gaussian distribution as shown below in Equation 3, $$P(F = f \mid L = l) = \frac{1}{\sqrt{2\pi}\,\sigma} \exp\left[-\frac{1}{2\sigma^2}(f - \mu_l)^2\right] \quad [3]$$

where $\mu_l$ is the mean value for the GGN or background intensity.

Figure 5:
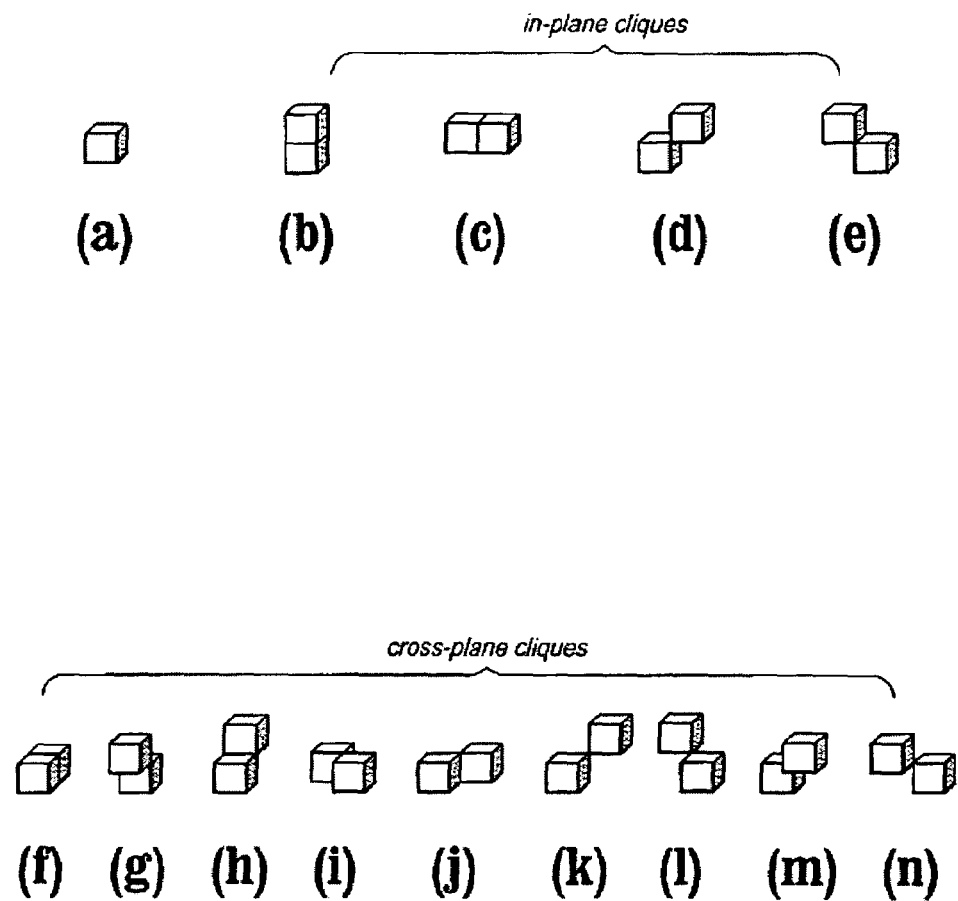
FIG. 5 illustrates a series of cliques used during a Markov random field according to an exemplary embodiment of the present invention.

Assuming that the segmentation labeling L is an MRF, then a priori probability P(L) is given by a Gibbs distribution as shown below in Equation 4, $$P(L=l) \propto \exp[-U(l)], \quad [4]$$

where the energy function $$U(l) = \sum_{c \in C} V_c(l)$$

is the summation over the set C of all one- and two-pixel cliques defined by a 3D neighborhood of 26-connectivity, which is used to define cliques (shown in FIG. 5), discussed hereinafter with reference to Equation 7. The potential function $V_c(l)$ of a one-pixel clique $C_l$ is defined by Equation 5, $$V_c(l) = \alpha_l, \text{ if } l_{\bar{x}} = l \quad [5]$$

where $l_{\bar{x}}$ is the label for the current voxel $\bar{x}$. $\alpha_l$ indicates a priori probability of a particular label l, i.e., a smaller $\alpha_l$ implies the label l is preferred by the a priori probability and a larger $\alpha_l$ implies the label l is not preferred. The potential function $V_c(l)$ of a two-pixel clique $c \in C_2$ is defined by Equation 6, $$V_c(l) = \begin{cases} -\beta_k & \text{if } l_{\bar{x}} = l_{\bar{x}_n}, \text{ where } \{\bar{x}, \bar{x}_n\} \in C_2 \\ \beta_k & \end{cases} \quad [6]$$

where $\bar{x}_n$ denotes, for example, a neighboring voxel in a two-pixel clique, and $\beta_k$ is designed based on the clique types shown in Equation 7, $$\beta_k = \begin{cases} \beta & \bar{x}_n \in \{4 \text{ edges on same slice}\} & (b)\text{-}(c) \\ \beta\exp(-w\sqrt{2}-1.0) & \bar{x}_n \in \{4 \text{ corners on same slice}\} & (d)\text{-}(e) \\ \beta\exp[-w(Z_{res}/X_{res}-1.0)] & \bar{x}_n \in \{2 \text{ centers on neighboring slices}\} & (f) \\ \beta\exp\left[-w\left(\sqrt{(Z_{res}/X_{res})^2+1.0}-1.0\right)\right] & \bar{x}_n \in \{8 \text{ edges on neighboring slices}\} & (g)\text{-}(j) \\ \beta\exp\left[-w\left(\sqrt{(Z_{res}/X_{res})^2+2.0}-1.0\right)\right] & \bar{x}_n \in \{8 \text{ corners on neighboring slices}\} & (k)\text{-}(n) \end{cases} \quad [7]$$

where (b), (c), . . . , (n) are the in-plane (e.g., b-e) and cross-plane (e.g., f-n) cliques as shown in FIG. 5, β is a predefined potential constant, and w is a weighting constant. $\beta_k$ is smaller when the distance between two pixels of a clique is larger, and larger when the distance between two pixels of a clique is smaller.

After determining the conditional probabilities using Equation 3 and the a priori probability P(L) using Equation 4, the resulting data from Equations 3 and 4 is inserted into Equation 2 to calculate the posteriori probability P(L|F) for labeling the GGNs and the background information. The optimization of the MAP then becomes the minimization process shown below in Equation 8.

$$MAP = \arg\min_L \left[ U(L) + \frac{1}{2\sigma^2}(F-\mu_L) \right] \quad [8]$$

where $L = \{l \mid GGN, \text{background}\}$.

The MAP of Equation 8, which is the final segmentation result, is then determined by the ICM procedure. The ICM procedure, which begins from an initial state (e.g., iteration 0) that was determined by the region growing in step 350, assigns a label $l_{\bar{x}}(i)$ to voxel $\bar{x}$ on each iteration i in Equation 9, $$l_{\bar{x}}(i) = \arg\min_{l \in \{g,b\}} \left\{ U(g, i-1) + \frac{1}{2\sigma^2}[f(\bar{x})-\mu_g], \right. \quad [9]$$
$$\left. U(b, i-1) + \frac{1}{2\sigma^2}[f(\bar{x})-\mu_b] \right\}$$

where U(g,i−1) and U(b,i−1) are energy values calculated from the labeling state of iteration i−1 for GGN and background labels, respectively. $f(\bar{x})$ is the intensity value for voxel $\bar{x}$, and $\mu_g$ and $\mu_b$ are the mean intensity values for the GGN and background labels, respectively.

Figure 6:
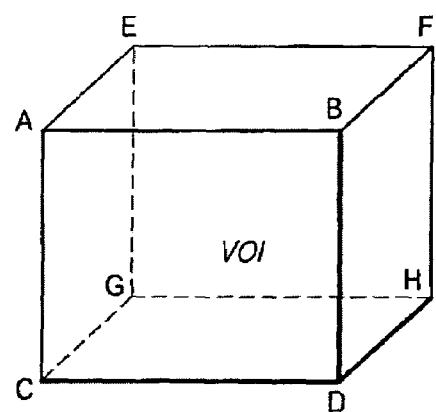
FIG. 6 illustrates an order of a raster scan used by an iterated conditional mode (ICM) according to an exemplary embodiment of the present invention.

During each ICM iteration a raster scan of the VOI is performed, and thus the voxels in the VOI are given a GGN or a background label. As shown in FIG. 6, voxel labeling is updated by performing a raster scan in eight different ways: (1) from the upper-left-front corner (A) to the lower-right-back corner (H) of the VOI; (2) from the upper-right-front corner (B) to the lower-left-back corner (G) of the VOI; (3) from the lower-left-front corner (C) to the upper-right-back corner (F) of the VOI; (4) from the lower-right-front corner (D) to the lower-right-back corner (E) of the VOI; (5) from the lower-right-back corner (H) to the upper-left-front corner (A) of the VOI; (6) from the lower-left-back corner (G) to the upper-right-front corner (B) of the VOI; (7) from the upper-right-back corner (F) to the lower-left-front corner (C) of the VOI; and (8) from the upper-left-back corner (E) to the lower-right-front corner (D) of the VOI.

The above process (where for each ICM iteration the raster scan is performed in one of the eight ways) is repeated until a convergence is observed. In other words, the above process is repeated until labels of all of the voxels in the VOI are not changed any more. It is to be understood that alternative raster scan procedures having a different number of scan orders and/or sequences can be used in the above process.

After the VOI has been segmented using the Markov random field in step 360, the segmented VOI undergoes further processing (steps 370-392). In particular, blood vessels attached to or near the GGN are removed from the segmented VOI by performing a shape analysis. An example of this is observed in FIG. 8 where blood vessels that were attached to the GGNs were removed. The blood vessels are removed from the GGNs and/or the VOI, for example, by first identifying the blood vessels attached to or near the GGN by performing a thresholding and a compactness measurement to distinguish the blood vessels from the solid component in the GGN, and then removing the blood vessels that are attached to or near the GGN and smoothing the results by applying a series of morphological operations.

As used herein, a Hounsfield unit (HU) for CT data sets describes the density of material and ranges from −1000 for air, through 0 for water, to higher values for materials of higher densities.

In detail, the technique of removing blood vessels from GGNs in a VOI is as follows. In order to identify vessels in accordance with the present invention, thresholding is applied in the VOI, first with a high threshold $T_{high}$, for example, −400HU, to identify vessels. The process of connected component labeling is used on the thresholded VOI to find high intensity regions. For a description of connected component segmentation, see, for example, the aforementioned book by Weeks, pp. 448 et seq.; and the aforementioned book by Gonzalez et al., p. 664 et seq. The high intensity regions include vessel branches in the VOI and solid components in the GGN.

3D compactness of a high intensity region is then used to distinguish vessels from the solid components in the GGN, as will next be described.

Compactness refers to a known shape description characteristic independent of linear shape transformations. See, for example, the aforementioned book by Sonka et al., p. 259. The compactness of a 3D shape S can be defined as follows $$C = V \bigg/ \frac{4}{3}\pi R_d^3 \qquad [10]$$

where $R_d$, the radius of S, is calculated from the distance transform map of S, that is, $$R_d = \max\{D_{\bar{x}}, \bar{x} \in S\}, \qquad [11]$$

where $D_{\bar{x}}$ is the distance transform value at location $\bar{x}$. The distance transform as used herein assigns a value to each region pixel representing its shortest distance from the region's boundary. See, for example, the aforementioned book by Sonka et al. (p. 269).

Figure 9:
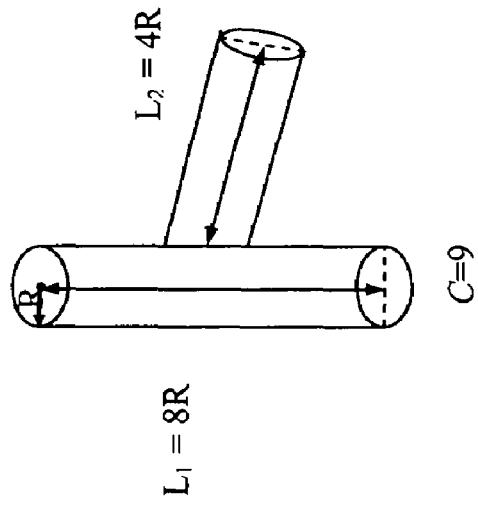
FIG. 9 shows the basis for compactness calculation for a sphere, a cylinder, and connected cylinders.
Figure 9:
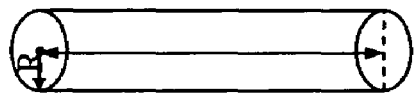
Figure 9:
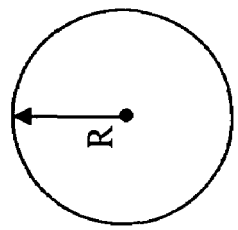

If we approximate the solid components in GGN segmentation as spheres, vessels in the VOI as cylinders or connected cylinders (see FIG. 9), then the vessels in the VOI are less compact than the solid components in GGN, and thus the vessel branches have much higher compactness values than the solid components in a GGN according to Equation 10. For example, the compactness values for the three different shapes shown in FIG. 9 can be calculated as follows.

$$C_{sphere} = 1 \qquad [12]$$

$$C_{cylinder} = \pi R^2 L \bigg/ \frac{4}{3}\pi R^3 = 6$$

$$C_{cylinder} = \pi R^2 (L_1 + L_2) \bigg/ \frac{4}{3}\pi R^3 = 9$$

From the above example, it is apparent that cylinders, whether a single cylinder or connected cylinders, are found to exhibit a high compactness value, whereas a sphere exhibits a low compactness value. Therefore, vessel branches in the VOI can be selected from high intensity regions by their high compactness value, for example, a compactness value greater than 3.

As mentioned above, when a GGN is close to the lung boundary, part of the chest wall may also be included in the VOI. The chest wall in the VOI is also a high intensity region, and may be less compact if only a narrow or irregular part thereof is included in the VOI. The chest wall can be distinguished from the vessels based on the fact that the chest wall is always located on a corner of the VOI.

In the vessel identification step, a high threshold is used to segment vessels. Due to the partial volume effect, boundary voxels that belong to vessels are not included. To complete the vessel segmentation, a lower threshold must be applied. However, a lower threshold had been utilized in the first step to find connected high intensity regions, lung parenchyma would be included and connected to vessels and, as a result, vessels cannot be identified. Thus, a high threshold must be first used to identify vessels and, once the vessels are identified, a lower threshold can then be used to get complete vessel segmentation.

To include the boundary voxels into the vessel segmentation, an intensity constrained dilation is used to get the complete vessel segmentation $O_v$ as follows $$O_v O_{vc} \cup \{\bar{x}|\bar{x} \in (O_{vc} \oplus SE - O_{vc}) \text{ and } I_{\bar{x}} \geq T_{low}\}, \qquad [13]$$

where $O_{vc}$ is the vessel core part segmentation obtained from the vessel identification step. $\oplus$ denotes morphological dilation, and SE is the dilation structure element (3×3×3 cube). $I_{\bar{x}}$ is the intensity value at location $\bar{x}$, and $T_{low}$ is the lower threshold used to perform vessel segmentation, for example, $T_{low} = -624$.

Figure 10:
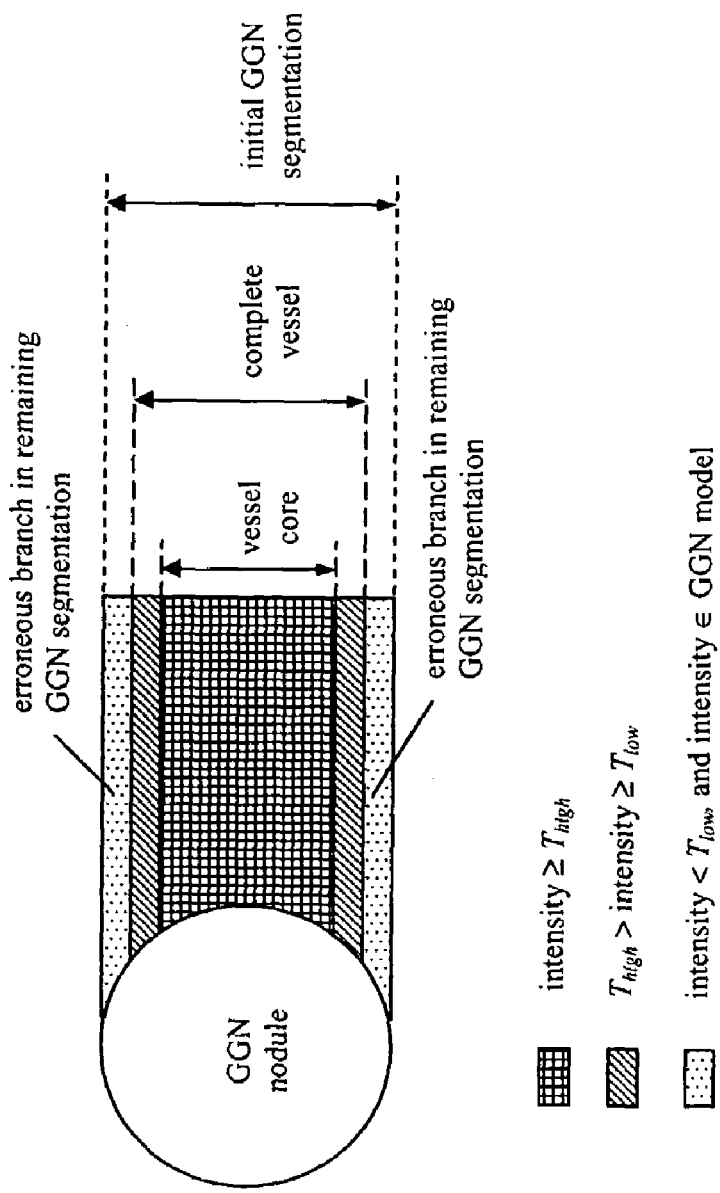
FIG. 10 shows in diagrammatic fashion erroneous branches in GGN segmentation caused by vessel inclusion.

The complete vessel segmentation $O_v$ is removed from the initial GGN segmentation $O_{initggo}$ to get the GGN segmentation without vessels $O_{onlyggo} = O_{initggo} - O_v$ Even after vessel segmentation removal, the remaining GGN segmentation may have extra small branches caused by erroneous vessel inclusion since the GGN intensity model includes lower intensities than boundary vessel voxels, as shown in FIG. 10.

Thus, as shown in FIG. 10, an erroneous branch remains in the GGN segmentation, with a low intensity of a value included in the range of the GGN model. Furthermore, other lung structures with high intensity, such as lobar fissures, scar tissue, and the like structures, may also cause erroneous branches in GGN segmentation. To remove such small branches, which are typically of smaller dimension than the diameter of the GGN, morphological opening, also constrained by intensity, is applied to $O_{onlyggn}$ in order to get a cleaned final GGN segmentation $O_{ggn}$ as follows.

$$O_{ggn} = (O_{onlyggn} \circ SE) - (\{\bar{x}|\bar{x} \in (O_{onlyggn} \circ SE)\} \cap \{\bar{x}|\bar{x} \notin O_{onlyggn}\} \cap \{\bar{x}|I_{\bar{x}} < T_{low}\}), \qquad [14]$$

where $\circ$ denotes morphological opening and SE is a structuring element. In Equation 14, the part before the minus sign is the general form of morphological opening, and the part following the minus sign imposes an intensity constraint, that is, if a pixel added by dilation is lower than the threshold $O_{ggn}$, this pixel would be removed from the final segmentation. The intensity constraint prevents nearby dark voxels from being included in the GGN segmentation. The structuring element SE is a 2D disk since a one or two slice thick GGN segmentation could be deleted by morphological opening with a 3D structure element.

Figure 8:
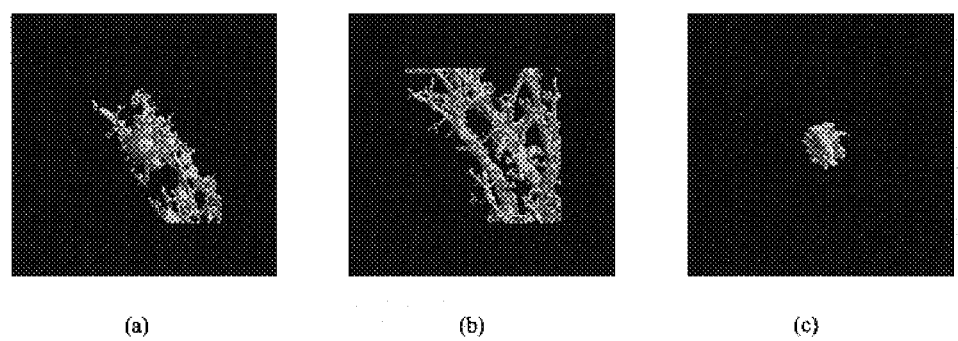
FIG. 8 shows: (a) an initial over-segmented GGN with vessels, (b) vessel segmentation, and (c) final nodule segmentation, without vessels, in accordance with principles of the present invention.

FIG. 8 shows an example of the application of the invention, where in FIG. 8(a), the initial result is a massive over-segmentation since the GGN is close to vessels. FIG. 8(b) shows the vessel segmentation in the VOI, and FIG. 8(c) shows the final GGN segmentation without over-segmented vessels.

Figure 7:
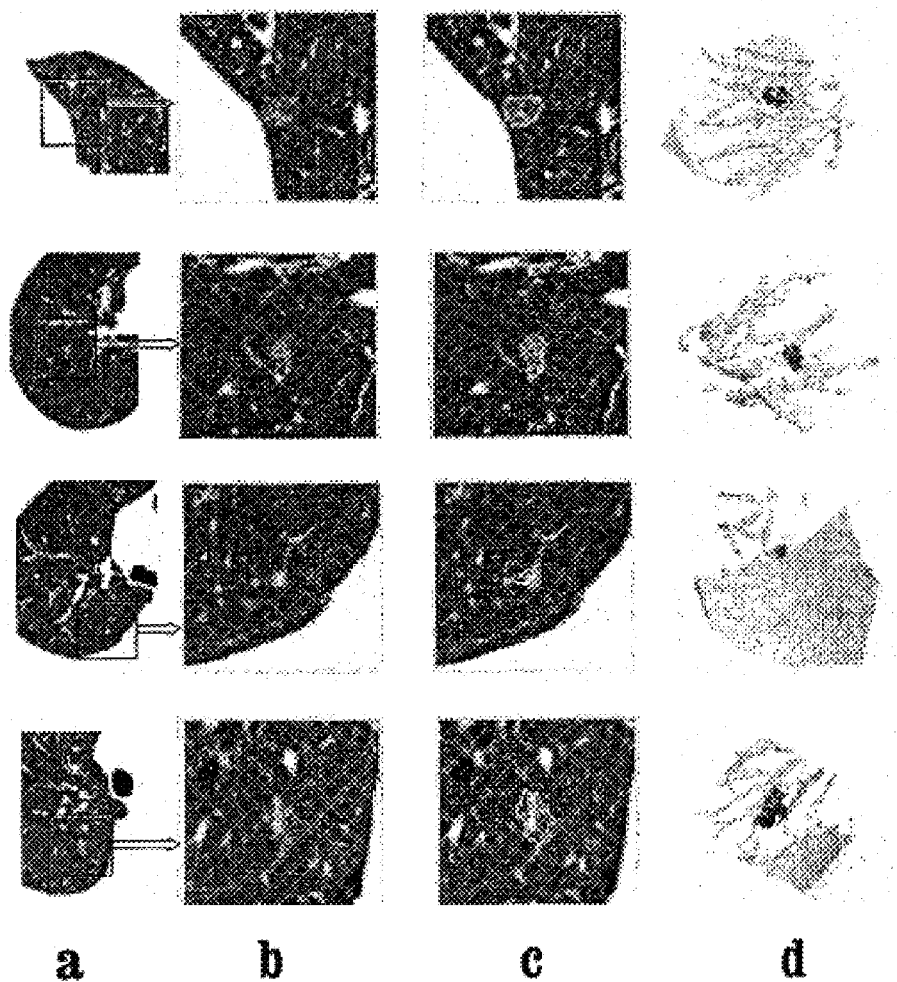
FIG. 7 illustrates several GGNs before and after performing GGN segmentation according to an exemplary embodiment of the present invention.

An example of GGNs being displayed after MRF segmentation in accordance with the present invention has been performed is illustrated in column (d) of FIG. 7 where dark portions in the center of the images are the GGNs.

Thus, by performing MRF segmentation according to the present invention, GGNs in medical images are accurately and quickly distinguished from background information by assigning labels to their associated voxels, thereby enabling GGNs to be visualized by a medical expert for diagnosing and evaluating certain lung ailments.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for ground glass nodule (GGN) segmentation, comprising:
    selecting a point in a medical image, wherein said point is located in a GGN;
    defining a volume of interest (VOI) around said point, wherein said VOI comprises said GGN;
    obtaining an initial state for a Markov random field;
    segmenting said VOI, wherein said VOI is segmented using said Markov random field;
    identifying vessels in the volume of interest;
    segmenting the vessels; and
    removing segmented vessels from the segmented ground glass nodule.

2. A method for ground glass nodule (GGN) segmentation, comprising:
    selecting a point in a medical image, wherein said point is located in a GGN;
    defining a volume of interest (VOI) around said point, wherein said VOI comprises said GGN;
    removing a chest wall from said VOI;
    obtaining an initial state for a Markov random field;
    segmenting said VOI, wherein said VOI is segmented using said Markov random field; and
    performing a shape analysis to remove blood vessels attached to or near said GGN after said VOI has been segmented using said MarKov random field, wherein said step of performing a shape analysis comprises:
    identifying vessels in said VOI;
    segmenting said vessels; and
    removing segmented vessels from said segmented GGN.

3. A method as recited in claim 2, wherein said step of identifying said vessels comprises performing a thresholding and connected component analysis.

4. A method as recited in claim 2, wherein said step of identifying said vessels comprises performing a 3D compactness analysis.

5. A method as recited in claim 2, wherein said step of segmenting said vessels comprises performing intensity constrained dilation.

6. A method as recited in claim 2, including a step of performing a morphological operation following said step of removing segmented vessels.

7. A method as recited in claim 2, including a step of removing any chest wall from said VOI.

8. A method as recited in claim 7, wherein said step of removing a chest wall from said VOI comprises distinguishing said chest wall from vessels based on the fact that said chest wall is always located on a corner of said VOI.

9. A method as recited in claim 7, wherein said step of removing a chest wall from said VOI comprises utilizing a connected component technique to remove an area that belongs to said chest wall.

10. A method as recited in claim 2, comprising a step of morphological opening to remove small branches, which are smaller than said GGN, resulting from said step of removing segmented vessels.

11. A method as recited in claim 2, including a step of detecting said GGN utilizing a computer-aided GGN detection technique.

12. A method as recited in claim 2, including a step of detecting said GGN utilizing a manual technique for detecting said GGN.

13. A method as recited in claim 2, wherein said GGN comprises a pure GGN and a mixed GGN.

14. A method as recited in claim 2, wherein said step of identifying vessels comprises:
    applying thresholding with a sufficiently high threshold $T_{high}$, so as to identify vessels and thereby derive a thresbolded VOI;
    utilizing a process of connected component labeling on said thresholded VOI to find high intensity regions;
    utilizing 3-dimensional (3D) compactness of said high intensity regions to distinguish vessels from solid components in said GGN; and
    applying thresholding with a low threshold $T_{low}$, lower than said high threshold $T_{high}$, to obtain a more complete vessel segmentation.

15. A method as recited in claim 14, wherein said step of segmenting vessels VOI comprises applying an intensity constrained dilation so as to include boundary voxels into said vessel segmentation.

16. A method as recited in claim 14, wherein said step of segmenting vessels comprises applying an intensity constrained dilation so as to include boundary voxels into said vessel segmentation and obtain an essentially complete vessel segmentation $O_v$ as follows:

$$O_v = O_{vc} \cup \{\overline{x} \overline{x} \in (O_{vc} \oplus SE - O_{vc}) \text{ and } I_{\overline{x}} \geq T_{low}\},$$

wherein $O_{vc}$ is the vessel core part segmentation obtained from the foregoing step wherein vessels are distinguished from solid components in said GGN, $\oplus$ denotes morphological dilation, and SE is a dilation structure element, $I_{\overline{x}}$ is an intensity value at location $\overline{x}$, and $T_{low}$ is said lower threshold; and said step of removing segmented vessels from said initially segmented GGN comprises removing said essentially complete vessel segmentation $O_v$ from said segmented GGN obtained in said step of segmenting said VOI using a Markov random field (MRF) procedure, so as to obtain a final GGN segmentation without vessels $O_{onlyggo} = O_{inilggo} - O_v$.

17. A method as recited in claim 15, wherein said dilation structure element is 3×3×3 voxel cube.

18. A method as recited in claim 2 comprising:
    applying a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\overline{x}|\overline{x} \in (O_{onlyggn} \circ SE)\} \cap \{\overline{x}|\overline{x} \oplus_{onlyggn}\} \cap \{\overline{x}|I_{\overline{x}} < T_{low}\}),$$

wherein ∘ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $T_{low}$, then this pixel is removed from said cleaned final segmentation.

19. A method as recited in claim 18, wherein said structuring element SE is a 2D disk.

20. A method as recited in claim 2, comprising:
acquiring said medical image.

21. A method as recited in claim 20, wherein said medical image is acquired using a computed tomographic (CT) imaging technique.

22. A method as recited in claim 2, wherein said point is automatically selected.

23. A method as recited in claim 2, wherein said point is manually selected.

24. A method as recited in claim 2, further comprising:
detecting said GGN using a computer-aided GGN detection technique.

25. A method as recited in claim 2, further comprising:
detecting said GGN manually.

26. A method as recited in claim 2, wherein said GGN is one of a pure GGN and a mixed GGN.

27. A method as recited in claim 2, wherein said chest wall is removed by performing a connected component analysis.

28. A method as recited in claim 2, further comprising:
defining one of a shape and a size of said VOI.

29. A method as recited in claim 2, wherein the initial state for said Markov random field is obtained by performing a region growing on said VOI after said chest wall is removed.

30. A method as recited in claim 2, wherein the step of segmenting said VOI using said Markov random field comprises:
defining a posteriori probability for said VOI; and
labeling each pixel in said VOI to obtain a maximum of the posteriori probability, wherein each pixel in said VOI is labeled as one of a GGN and a background.

31. A method as recited in claim 30, wherein said defined posteriori probability is computed by $$P(L|F) \propto P(F|L)P(L).$$

32. A method as recited in claim 30, wherein the step of labeling each pixel is computed by $$l_{\overline{x}}(i) = \arg\min_{l \in \{g,b\}} \left\{ \begin{array}{l} U(g, i-1) + \frac{1}{2\sigma^2}[f(\overline{x}) - \mu_g], \\ U(b, i-1) + \frac{1}{2\sigma^2}[f(\overline{x}) - \mu_b] \end{array} \right\}.$$

33. A method as recited in claim 30, wherein said labeling comprises:
scanning said VOI until a convergence is reached.

34. A method as recited in claim 2, further comprising:
displaying said VOI segmented using said Markov random field.

35. A system for ground glass nodule (GGN) segmentation, comprising:
a memory device for storing a program; and
a processor in communication with said memory device, said processor operative with said program to:
define a volume of interest (VOI) around a GGN using data associated with a medical image of a lung,
obtain an initial state for a Markov random field,
segment said VOI, wherein said VOI is segmented using said Markov random field, and
perform a shape analysis to remove blood vessels attached to said GGN in said VOI segmented using said Markov random field.

36. A system as recited in claim 35, wherein said processor being operative to perform said shape analysis includes said processor being operative with said program to:
distinguish vessels from said VOI,
segment vessels in said initially segmented VOI, and
remove segmented vessels from said segmented GGN in said VOI.

37. A system as recited in claim 36, wherein said processor is operative with said program to remove a chest wall from said VOI.

38. A system as recited in claim 37, wherein said processor is operative with said program to distinguish said chest wall from vessels.

39. A system as recited in claim 38, wherein said processor is operative with said program to distinguish said chest wall from vessels based on the fact that said chest wall is always located on a corner of said VOI.

40. A system as recited in claim 37, wherein said processor is operative with said program to utilize a connected component technique to remove a region that belongs to said chest wall.

41. A system as recited in claim 37, wherein said processor is further operative with said program code to remove said chest wall by performing a connected component analysis.

42. A system as recited in claim 36, wherein said processor is operative with said program to apply a morphological opening operation to remove small branches, less than the size of said GGN, resulting from said step of removing vessels from said segmented GGN in said VOI.

43. A system as recited in claim 42, wherein said processor is operative with said program to detect said GGN utilizing a computer-aided GGN detection technique.

44. A system method as recited in claim 42, wherein said processor is operative with said program to detect said GGN utilizing a manual technique for detecting said GGN.

45. A system as recited in claim 36, wherein said GGN comprises a pure GGN and a mixed GGN.

46. A system as recited in claim 36, wherein said processor being operative with said program:
applies thresholding with a sufficiently high threshold $T_{high}$, so as to identify vessels and thereby derive a thresholded VOI;
utilizes a process of connected component labeling on said thresholded VOI to find high intensity regions;
utilizes a process of compactness analysis to identify vessels from high intensity regions;
utilizes 3-dimensional (3D) compactness of said high intensity regions to distinguish vessels from solid components in said GGN; and
applies thresholding with a low threshold $T_{low}$, lower than said high threshold $T_{high}$, to obtain a more complete vessel segmentation.

47. A system as recited in claim 46, wherein said processor, being operative with said program applies an intensity constrained dilation so as to include boundary voxels into said vessel segmentation.

48. A system as recited in claim 46, wherein said processor, being operative with said program, applies an intensity constrained dilation so as to include boundary voxels into said vessel segmentation and obtain an essentially complete vessel segmentation $O_v$ as follows:

$$O_v = O_{vc} \cup \{\overline{x} | \overline{x} \in (O_{vc} \oplus SE - O_{vc}) \text{ and } I_{\overline{x}} \geq T_{low}\},$$

wherein $O_{vc}$ is the vessel core part segmentation obtained from the foregoing operation wherein vessels are distinguished from solid cdmponents in said GGN, $\oplus$ denotes morphological dilation, and SE is a dilation structure element, $I_{\overline{x}}$ is an intensity value at location $\overline{x}$, and $T_{low}$ is said lower threshold; and said step of removing segmented vessels from said initially segmented GGN comprises removing said essentially complete vessel segmentation $O_v$ from an initial GGN segmentation $O_{initggo}$ of said GGN, so as to obtain GGN segmentation without vessels $O_{onlyggo} = O_{initggo} - O_v$.

49. A system as recited in claim 48, wherein said dilation structure element is 3×3×3 pixel cube.

50. A system as recited in claim 46, wherein said processor is operative with said program to apply a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\overline{x} | \overline{x} \in (O_{onlyggn} \circ SE)\} \cap \{\overline{x} | \overline{x} \notin O_{onlyggn}\} \cap \{\overline{x} | I_{\overline{x}} < T_{low}\}),$$

wherein ∘ denotes morphological opening, SE is a structuring element, and wherein in the foregoing equation, the part before the minus sign is the general form of morphological opening, and the part following the minus sign imposes an intensity constraint such that, if a pixel added by dilation is lower than the threshold $T_{low}$, then this pixel is removed from said cleaned final segmentation.

51. A system as recited in claim 50, wberein said processor is further operative with said program code to utilize a 2D disk as said structuring element SE.

52. A system as recited in claim 36, wherein said processor is further operative with said program code to:
acquire said medical image, wherein said medical image is acquired using a computed comographic (CT) imaging technique.

53. A system as recited in claim 36, wherein said processor is further operative with said program code to obtain the initial state for the Markov random field by performing a region growing on said VOI after said chest wall is removed.

54. A system as recited in claim 36, wherein said processor is further operative with said program code when segmenting said VOI using said Markov random field to:
define aposteriori probability for said VOI; and
label each pixel in said VOI to obtain a maximum of the posteriori probability, wherein each pixel in said VOI is labeled as one of a GGN and a background.

55. A system as recited in claim 54, wherein said processor is further operative with said program code to:
compute said defined posteriori probability by $$P(L|F) \propto P(F|L)P(L).$$

56. A system as recited in claim 55, wherein said processor is further operative with said program code to compute said step of labeling each pixel by:

$$l_{\overline{x}}(i) = \arg\min_{l \in \{g,b\}} \left\{ \begin{array}{l} U(g, i-1) + \frac{1}{2\sigma^2}[f(\overline{x}) - \mu_g], \\ U(b, i-1) + \frac{1}{2\sigma^2}[f(\overline{x}) - \mu_b] \end{array} \right\}.$$

57. A system as recited in claim 36, wherein said processor is further operative with said program code to:
display said VOI segmented using said Markov random field, wherein said GGN is visible.

58. A computer program product comprising a computer useable medium having computer program logic recorded thereon for ground glass nodule (GGN) segmentation, said computer program logic comprising:
program code for selecting a point in a medical image, wherein said point is located in or near a GGN;
program code for defining a volume of interest (VOI) around said point, wherein said VOI comprises said GGN;
program code for removing a chest wall from said VOI;
program code for obtaining an initial state for a Markov random field; and
program code for segmenting said VOI, wherein said VOI is segmented using said Markov random field;
identifying vessels from said VOI,
segmenting vessels in said VOI, and
removing segmented vessels from said VOI.

59. A system for ground glass nodule (GGN) segmentation, comprising:
means for selecting a point in a medical image, wherein said point is located in a GGN;
means for defining a volume of interest (VOI) around said point, wherein said VOI comprises said GGN;
means for removing a chest wall from said VOI;
means for obtaining an initial state for a Markov random field;
means for segmenting said VOI, wherein said VOI is segmented using said Markov random field;
means for identifying vessels from said VOI;
means for segmenting vessels in said VOI; and
means for removing segmented vessels from said VOI.

60. A method for ground glass nodule (GGN) segmentation in pulmonary computed tomographic (CT) volumes using a Markov random field, comprising:
selecting a GGN from data associated with a pulmonary CT volume;
defining a volume of interest (VOI) around said GGN;
removing a chest wall from said VOI by performing a connected component analysis on said VOI;
obtaining an initial state for an iterated condition mode (ICM) procedure by segmenting said VOI after said chest wall is removed; and
segmenting said VOI using a Markov random field, wherein the segmentation comprises:
defining aposteriori probability for said VOI,
performing said ICM procedure, wherein said ICM procedure comprises labeling each pixel in said VOI to obtain maximum of the posteriori probability, wherein each pixel in said VOI is labeled as one of a GGN and a background until the label of each pixel in said VOI is not changed any more, identifying vessels from said VOI,
segmenting vessels in said VOI, and
removing segmented vessels from said VOI.

61. A method as recited in claim 60, wherein the defined posteriori probability is computed by $$P(L|F) \propto P(F|L)P(L).$$

62. A method as recited in claim 60, wherein said step of labeling each pixel during said ICM procedure is computed by $$l_{\bar{x}}(i) = \arg\min_{l \in \{g,b\}} \left\{ \begin{array}{l} U(g, i-1) + \frac{1}{2\sigma^2}[f(\bar{x}) - \mu_g], \\ U(b, i-1) + \frac{1}{2\sigma^2}[f(\bar{x}) - \mu_b] \end{array} \right\}.$$

63. A method as recited in claim 60, wherein said ICM procedure begins from said initial state.

64. A method as recited in claim 63, comprising:
applying a morphological opening operation to remove small branches resulting from said step of removing segmented vessels from said initially segmented GGN;
applying thresholding with a sufficiently high threshold $T_{high}$, so as to identify vessels and thereby derive a thresholded VOI;
utilizing a process of connected component labeling on the thresbolded VOI to find high intensity regions;
utilizing 3-dimensional (3D) compactness of said high intensity regions to distinguish vessels from solid components in said GGN; and
applying intensity constrained dialation with a low threshold $T_{low}$, lower than said high threshold $T_{high}$, to obtain a more complete vessel segmentation.

65. A method as recited in claim 64, wherein said step of segmenting vessels in said VOI comprises applying an intensity constrained dilation so as to include boundary voxels into said vessel segmentation.

66. A method as recited in claim 64, wherein said step of segmenting vessels in said VOI comprises applying an intensity constrained dilation so as to include boundary voxels into said vessel segmentation and obtain an essentially complete vessel segmentation $O_v$ as follows:

$$O_v = O_{vc} \cup \{\bar{x}|\bar{x} \in (O_{vc} \oplus SE - O_{vc}) \text{ and } I_{\bar{x}} \geq T_{low}\},$$

wherein $O_{vc}$ is the vessel core part segmentation obtained from the foregoing step wherein vessels are distinguished from solid components in said GGN, $\oplus$ denotes morphological dilation, and SE is a dilation structure element, $I_{\bar{x}}$ is an intensity value at location $\bar{x}$, and $T_{low}$ said lower threshold; and
said step of removing segmented vessels from said initially segmented GGN comprises removing said essentially complete vessel segmentation $O_v$ from an initial GGN segmentation $O_{initggo}$ of said an initially segmented GGN, so as to obtain GGN segmentation without vessels $O_{onlyggo} = O_{initggo} - O_v$.

67. A method as recited in claim 66, including a step of removing a chest wail from said VOI.

68. A method as recited in caim 67, wherein said step of removing a chest wall from said VOI comprises distinguishing said chest wall from vessels based on the fact that said chest wall is always located on a corner of said VOI.

69. A method as recited in claim 67, wherein said step of removing a chest wall from said VOI comprises utilizing a connected component analysis technique to remove a region that belongs to said chest wall.

70. A method as recited in claim 67, including a step of detecting said GGN utilizing a computer-aided GGN detection technique.

71. A method as recited in claim 64, including a step of detecting said GGN utilizing a manual technique for detecting said GGN.

72. A method as recited in claim 64, wherein said GGN comprises a pure GGN and a mixed GGN.

73. A method as recited in claim 64, wherein said step of applying a morphological opening operation comprises:
applying morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\bar{x}|\bar{x} \in (O_{onlyggn} \circ SE)\} \cap \{\bar{x}|\bar{x} \notin O_{onlyggn}\} \cap \{\bar{x}|I_{\bar{x}} < T_{low}\}),$$

wherein $\circ$ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $T_{low}$, then this pixel is removed from said cleaned final segmentation 74. A method as recited in claim 73, wherein said structuring element SE is a 2D disk.

75. A method as recited in claim 74, including a step of removing a chest wall from said VOI.

76. A method as recited in claim 60, wherein said step of defining a volume of interest comprises defining the shape and size of said VOI.

77. A method as recited in claim 60, wherein said step of segmenting vessels comprises:
applying thresholding with a sufficiently high threshold $T_{high}$, so as to identify vessels and thereby derive a thresholded VOI;
utilizing a process of connected component labeling on said thresholded VOI to find high intensity regions;
utilizing 3-dimensional (3D) compactness of said high intensity regions to distinguish vessels from solid components in said GGN; and
applying intensity constrained dilation with a low threshold $T_{low}$, lower than said high threshold $T_{high}$, to obtain a more complete vessel segmentation.

78. A method as recited in claim 60, wherein said step of segmenting vessels comprises applying an intensity constrained dilation so as to include boundary voxels into said vessel segmentation.

79. A method as recited in claim 60, wherein said step of segmenting vessels comprises applying an intensity constrained dilation so as to include boundary voxels into said vessel segmentation and obtain an essentially complete vessel segmentation $O_v$ as follows:

$$O_v = O_{vc} \cup \{\bar{x}|\bar{x} \in (O_{vc} \oplus SE - O_{vc}) \text{ and } I_{\bar{x}} \geq T_{low}\},$$

wherein is the vessel core part segmentation obtained from the foregoing step wherein vessels are distinguished from solid components in said GGN, $\oplus$ denotes morphological dilation, and SE is a dilation structure element, $I_{\bar{x}}$ is an intensity value at location $\bar{x}$, and $T_{low}$ said lower threshold; and said step of removing segmented vessels from said initially segmented VOI comprises removing said essentially complete vessel segmentation $O_v$ from an initial GGN segmentation $O_{initggo}$ of said VOI, so as to obtain GGN segmentation without vessels $O_{onlyggo} = O_{initggo} - O_v$.

80. A method as recited in claim 79, wherein said dilation structure element is 3×3×3 voxel cube.

81. A method as recited in claim 60, comprising:

applying a morphological opening operation, constrained by intensity, to $O_{onlyggn}$ so as to obtain a cleaned final GGN segmentation $O_{ggn}$, free of any remaining extra branches due to erroneous vessel inclusion resulting from a GGN intensity model including lower intensities than boundary vessel voxels, as follows:

$$O_{ggn} = (O_{onlyggn} \circ SE) - (\{\overline{x} | \overline{x} \in (O_{onlyggn} \circ SE)\} \cap \{\overline{x} | \overline{x} \notin O_{onlyggn}\} \cap \{\overline{x} | I_{\overline{x}} < T_{low}\}),$$

wherein ○ denotes morphological opening, SE is a structuring element, and wherein in the foregoing equation, the part before the minus sign is the general form of morphological opening, and the part following the minus sign imposes an intensity constraint such that if a pixel added by dilation is lower than the threshold $T_{low}$, then this pixel is removed from said cleaned final segmentation.

82. A method as recited in claim 81, wherein said structuring element SE is a 2D disk.

* * * * *